(12) United States Patent
Pal et al.

(10) Patent No.: US 12,298,251 B2
(45) Date of Patent: May 13, 2025

(54) SYSTEM AND METHODS FOR REMOTE ASSESSMENT OF A SAMPLE ASSAY FOR DISEASE DIAGNOSTICS

(71) Applicant: Quidel Corporation, San Diego, CA (US)

(72) Inventors: Andrew Attila Pal, San Diego, CA (US); Werner Kroll, Wayland, MA (US); Adonis Stassinopoulos, Dublin, CA (US)

(73) Assignee: Ortho-Clinical Diagnostics, Inc., Raritan, NJ (US)

( * ) Notice: Subject to any disclaimer, the term of this patent is extended or adjusted under 35 U.S.C. 154(b) by 930 days.

(21) Appl. No.: 17/423,053

(22) PCT Filed: Jan. 15, 2020

(86) PCT No.: PCT/US2020/013762
§ 371 (c)(1),
(2) Date: Jul. 14, 2021

(87) PCT Pub. No.: WO2020/150403
PCT Pub. Date: Jul. 23, 2020

(65) Prior Publication Data
US 2022/0065795 A1 Mar. 3, 2022

Related U.S. Application Data

(60) Provisional application No. 62/843,846, filed on May 6, 2019, provisional application No. 62/792,813, filed on Jan. 15, 2019.

(51) Int. Cl.
*B01L 3/00* (2006.01)
*B01F 33/302* (2022.01)
(Continued)

(52) U.S. Cl.
CPC ..... *G01N 21/8483* (2013.01); *G01N 21/6456* (2013.01); *G01N 2021/6417* (2013.01);
(Continued)

(58) Field of Classification Search
CPC ........... G01N 21/8483; G01N 21/6456; G01N 2021/6417; G01N 2021/6463; G01N 2021/7759; G01N 2201/0221
See application file for complete search history.

(56) References Cited

U.S. PATENT DOCUMENTS

2002/0060295 A1 5/2002 Ikami et al.
2015/0137007 A1 5/2015 Lo et al.

FOREIGN PATENT DOCUMENTS

WO  WO 2013/158504 A1  10/2013
WO  WO 2018/154078 A1  8/2018
WO  WO 2020/150403 A1  7/2020

OTHER PUBLICATIONS

International Search Report from International Application No. PCT/US2020/013762, 8 pages, Mailed Jun. 29, 2020, Application now published as International Publication No. WO2020/150403 on Jul. 23, 2020.

(Continued)

*Primary Examiner* — Jennifer Wecker
*Assistant Examiner* — Oyeleye Alexander Alabi
(74) *Attorney, Agent, or Firm* — McDermott Will & Emery LLP; Brennen P. Baylor; Judy M. Mohr

(57) ABSTRACT

A method for performing a lateral flow assay is provided. The method includes inserting a sample cartridge (201) in a dark chamber (220) and activating a light emitter (251) in the dark chamber (220). The method includes focusing an optical coupling mechanism (115*a*, 115*b*) in an image-capturing device (100*a*, 100*b*) to optimize an image of a sensitive area (202) in the sample cartridge (201) and (Continued)

capturing, with an image capturing device (100a, 100b), an image of a sensitive area (202) in the sample cartridge (201) after a selected period of time. The method also includes providing the image of the sensitive area (202) to a processor, wherein the processor comprises an image-capturing application (122). A system and a computer-implemented method to perform at least partially the above method are also provided.

14 Claims, 14 Drawing Sheets

(51) Int. Cl.
    *B01F 33/3033*      (2022.01)
    *B01L 7/00*      (2006.01)
    *C12Q 1/6848*      (2018.01)
    *C12Q 1/686*      (2018.01)
    *G01N 21/64*      (2006.01)
    *G01N 21/77*      (2006.01)
    *G01N 21/84*      (2006.01)

(52) U.S. Cl.
    CPC ............... *G01N 2021/6463* (2013.01); *G01N 2021/7759* (2013.01)

(56) References Cited

OTHER PUBLICATIONS

Long et al., "Multimode smartphone biosensing: the transmission, reflection, and intensity spectral (TRI)-analyzer", Lab Chip, vol. 17, No. 19, pp. 3246-3257 (2017).

SYSTEM AND METHODS FOR REMOTE ASSESSMENT OF A SAMPLE ASSAY FOR DISEASE DIAGNOSTICS

CROSS-REFERENCE TO RELATED APPLICATIONS

This application is a U.S. National Stage Application under 35 U.S.C. § 371 which claims the benefit of priority to International Patent Application No. PCT/US2020/013762, filed on Jan. 15, 2020, which claims the benefit of U.S. Provisional Patent Application No. 62/792,813, filed on Jan. 15, 2019 and of U.S. Provisional Patent Application No. 62/843,846, filed on May 6, 2019, each incorporated by reference herein in its entirety.

TECHNICAL FIELD

The present disclosure generally relates to devices and methods for telemedicine applications and other in-situ immunoassay measurements. More specifically, the present disclosure relates to consumables, which in conjunction with client devices used by consumers may be used in a simple and accurate procedure to assess a disease diagnostic locally and/or remotely.

BACKGROUND

Currently, disease diagnostics using test assays involve users sending test samples to a laboratory for accurate analysis. This step is time-consuming, as it involves the physical displacement of a sample cartridge back (with the test sample) and forth (before use of the test sample) between the medical provider (e.g., clinic, physician, pharmacy, or laboratory), and the user. Furthermore, these test samples tend to drag the queues in the list of tasks of clinical laboratories, many times unnecessarily (as some samples, or most, may be negative). Additionally the need to visit a doctor's office in order to have the test performed may help the spread of infectious diseases through the exposure of uninfected patients to the carrier of a positive test (e.g., in the waiting room of a doctor's office). Further, the time lag between test and result may be a potential hazard, e.g., for epidemic or pandemic emergencies, or when the outcome of treatment of a serious condition is dramatically impacted by the time of start of a therapy.

BRIEF SUMMARY

In a first aspect, a method comprising inserting a sample cartridge in a dark chamber and activating a light emitter in the dark chamber is provided. The method also comprises focusing an optical coupling mechanism in an image-capturing device to optimize an image of a sensitive area in the sample cartridge, capturing, with an image capturing device, an image of a sensitive area in the sample cartridge after a selected period of time, and providing the image of the sensitive area to a processor, wherein the processor comprises an image-capturing application.

In another aspect, a system is provided that comprises an enclosure including a dark chamber, the enclosure configured to block ambient light from entering the dark chamber. The system also comprises a cartridge aperture on a side of the enclosure to enable a sample cartridge to be disposed at least partially inside the dark chamber, wherein the cartridge aperture is configured to at least partially close when the sample cartridge is at least partially disposed inside the dark chamber. The system also comprises an optical coupler inside the enclosure to form a partial image of the sample cartridge in a sensor array of an image-capturing device, when the sample cartridge is at least partially disposed in the dark chamber. The system also comprises a light emitting device in an interior portion of the enclosure, the light emitting device configured to emit a fluorescence excitation light directed to the sample cartridge.

In another aspect, a computer-implemented method is provided that comprises identifying, upon receipt of a user input, a fiduciary figure in a bottom side of an enclosure with an image-capturing device and adjusting, in the image-capturing device, an optical coupling to obtain a sharp image of the fiduciary figure. The computer-implemented method also comprises identifying a sensitive area of a sample cartridge within a field of view of the optical coupling and finding a border of the sensitive area of the sample cartridge and applying geometrical transformations on an area delimited by the border of the sample cartridge. The computer-implemented method also comprises identifying a target region within the sensitive area of the sample cartridge, extracting a value of a selected color for multiple pixels in the target region, and determining a presence of a target analyte when the value of the selected color is greater than a pre-selected threshold.

DETAILED DESCRIPTION

Figure 1A:
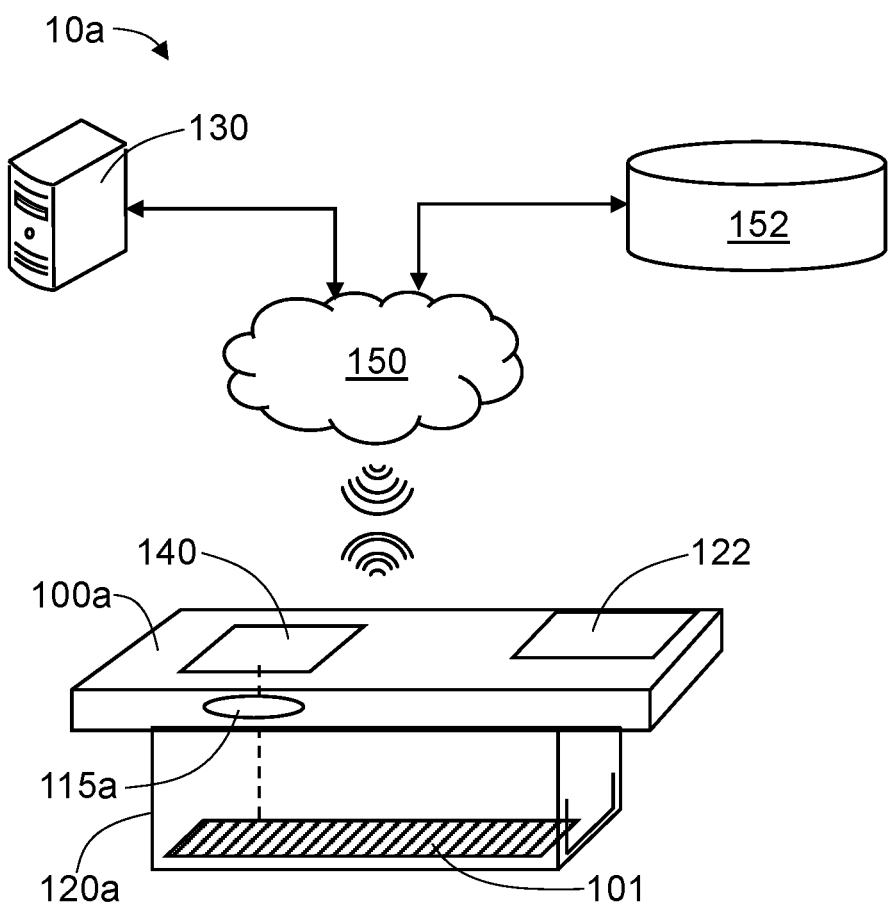
FIGS. 1A-1B illustrate architectures including a remote server, a database, and an image-capturing device to collect an image from a sample cartridge in an enclosure, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In the burgeoning area of telemedicine, it has become increasingly desirable to take advantage of the almost universal availability of electronic appliances that may have wireless network access and sensors and that may also include increasingly higher computational capabilities. The image-capturing capabilities of mobile computer devices and other consumer products have increased resolution and offer the capability for digital processing (e.g., spatial filtering and adjustment, and spectral filtering). There remains a growing need for remote measurement of immunoassays for the detection of chemical and biological agents or pathogens may include security tests and screening (e.g., at airports, police, and military checkpoints), or environmental analysis and monitoring (e.g., air pollution, contamination of water ways and reservoirs—for disease control or agricultural production—, and the like).

Embodiments consistent with the present disclosure take advantage of the high image-capturing and processing capabilities of consumer appliances to provide simple yet accurate diagnostic method, system and procedure for detection of, for example, infectious agents or biomarkers of diseases or disorders (e.g., legionella, influenza, Ebola, Lyme disease, and the like). The types of tests consistent with embodiments in the present disclosure may include any type of spectroscopic analysis of test assays using electromagnetic radiation, such as, without limitation, absorption spectroscopy (ultra-violet, visible, or infrared) including reflectance or transmittance spectroscopy, or emission spectroscopy, including fluorescence and luminescence spectroscopy, Raman spectroscopy, and any type of radiation scattering. Moreover, embodiments as disclosed herein may further exploit the networking capabilities of such appliances to enhance the processing capabilities of each test by using cloud-computing solutions. Accordingly, in some embodiments, a high quality (e.g., high spatial and spectral resolution) image, sequence of images, or video is uploaded to a remote server that can perform massively parallel computations to provide, in a reduced time, a diagnostic result. Such analyzed material may be processed immediately, at a later date/time, and or may be compared to previously collected materials to determine differences over time, e.g., a time evolution of the analyte across a test strip.

The subject system provides several advantages, including the ability for a user to quickly learn whether a disease is present or latent, without the need to access specialized personnel, or a complex machine or instrument.

Some embodiments provide the advantage of widely broadening the market for medical test kits, as consumers who have wide access to image-capturing devices in the form of mobile computing devices and other appliances, may desire to perform tests even before perceiving any symptoms or going to a doctor or clinic. This also may provide the advantage of a screening step before people attend clinics to avoid exposure of innocent bystanders, or saturate the resources of a given medical facility. Further, the cost of a test for a remote user of methods as disclosed herein may be substantially lower than the cost associated with a visit to a clinic or laboratory, including waiting times and scheduling.

The proposed solution further provides improvements to the functioning of computers (e.g., the server or a user mobile device) because it saves data storage space and interaction time by enabling a remote transmission of image analysis data and results (e.g., pictures, sequences of pictures, and/or videos).

Although many examples provided herein describe a user's personal information and data as being identifiable, or a download and storage of a user interaction history with one or more remote clinics, each user may grant explicit permission for such user information to be shared or stored. The explicit permission may be granted using privacy controls integrated into the disclosed system. Each user may be provided notice that such user information will be shared with explicit consent, and each user may at any time end the information sharing, and may delete any stored user information. Further, in some embodiments, the stored and/or transmitted user information may be encrypted to protect user security and identity.

FIG. 1A illustrates an architecture 10A including a remote server 130, a database 152, and an image-capturing device 100A to collect an image or video from a sample cartridge 101 in an enclosure 120A, according to some embodiments. In some embodiments, database 152, server 130, and image-capturing device 100A may be communicatively coupled via a network 150 (e.g., through an Ethernet link, an optical link, a wireless link, a cellular network, and the like). Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

In the architecture illustrated in the figure, sample cartridge 101 and enclosure 120A may be consumables that the user may dispose of after use. For example, sample cartridge 101 may be discarded or disposed of after a single use with a test sample, while enclosure 120A may be used more than one time, and in some embodiments is used repeatedly. In that regard, sample cartridge 101 and enclosure 120A may be part of a package or kit requested by or provided to the user from a clinical service provider. The package may include one enclosure 120A and multiple cartridges 101 that may be used with it. Alternatively, enclosure 120A may be provided separately from the cartridge(s) 101.

In one embodiment, remote diagnostic architecture 10a includes an image-capturing device 100a provided by the user. This may include a smartphone or other mobile computing device (e.g., tablet, pad, or even laptop) including a sensor array 140 and an optics coupling mechanism 115A (e.g., a lens system with autofocus capabilities). Image-capturing device 100a may be configured to couple wirelessly, through a network, with remote server 130 and database 152. Remote server 130 may provide support for an image-capturing application 122 installed in image-capturing device 100a. The support may include update installation, retrieval of raw data (e.g., pictures, sequences of pictures and videos) for storage in database 152, image processing, and the like.

Figure 1B:
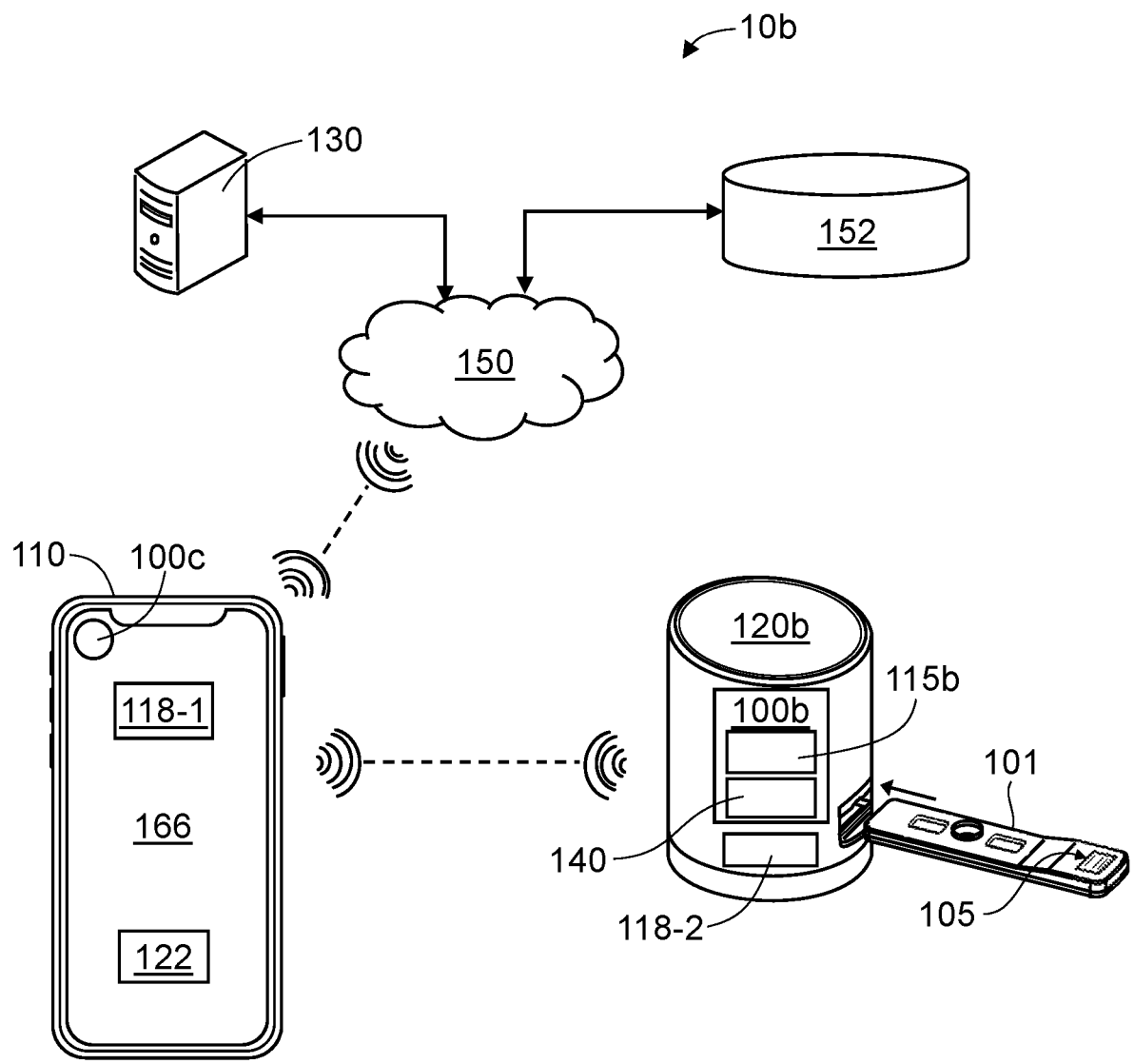

FIG. 1B illustrates an architecture 10b including a remote server 130, a database 152, a user device 110, and an enclosure 120b to collect an image or video from sample cartridge 101, according to another embodiment. Client device 110 may include a smartphone or other mobile computing device (e.g., tablet, pad, or even laptop). Accordingly, in some embodiments, architecture 10B includes a user of client device 110 who has ordered a kit including sample cartridge 101 and enclosure 120B and is ready to perform a personal test for a disease or condition remotely from a hospital or clinic (e.g. at home, in a pharmacy, or in any other location).

In architecture 10B, enclosure 120B includes an image-capturing device 100B and wirelessly transmits an image of sample cartridge 101 to client device 110. Client device 110 then may transmit the image or video to a remote server 130, to database 152, or both, via network 150, for processing. In some embodiments, client device 110 may perform at least one or more operations to the image or one or more image frames from a video before transmitting the image to server 130 or to database 152. For example, in some embodiments, client device may perform at least one or more quality control steps over the one or more images provided by enclosure 120B before transmitting to server 130. In some embodiments, client device 110 may obtain a preliminary or a definitive diagnostic based on the analysis of the image of sample cartridge 101. Accordingly, in some embodiments, client device 110 may transmit the preliminary or definitive diagnostic to server 130 with or without an image of sample cartridge 101.

Client device 110 communicates with server 130 and with enclosure 120B using a communications module 118-1. Enclosure 120B may communicate with client device 110 through a communications module 118-2. Communications modules 118-1 and 118-2 will be collectively referred to, hereinafter, as "communications modules 118." Communications modules 118 may include hardware and software associated with radio-frequency (RF) antennas for communication via WiFi, Bluetooth (e.g., low energy Bluetooth, BLE), or nearfield contact (NFC) protocols. For example, when enclosure 120B and client device 110 are relatively close to each other, communications module 118 may include a BLE or NFC protocol.

In some embodiments, image-capturing device 100b in enclosure 120b may include a sensor array 140 and an optics coupling mechanism 115b (e.g., a lens system with autofocus capabilities). Sensor array 140 may collect one or more images of sample cartridge 101 at a desired frame rate, to form a video. In some embodiments, sensor array 140 may collect a single image of sample cartridge 101 (e.g., after an assay has run its course), or more than one image (e.g., before and after an assay runs its course). In yet some embodiments, sensor array 140 may collect multiple images of sample cartridge 101 at a pre-selected frequency rate. The frequency rate may be adjusted, modified, accelerated, or slowed, based on preliminary or quality control tests performed by client device 110. In some embodiments, sensor array 140 is coupled to a processor that may perform, at least partially, an analysis of an image before transmitting it to client device 110.

Remote server 130 may provide support for an image-capturing application 122 installed in client device 110. The support may include update installation, retrieval of raw data (e.g., pictures, sequences of pictures and videos) for storage in database 152, image processing, and the like. Image-capturing application 122 may include commands and instructions to control image-capturing device 100b. Image-capturing application 122 may also include commands and instructions to perform at least a partial analysis of the one or more images provided by enclosure 120B. For example, in some embodiments, the instructions in image-capturing application 122 may include a neural network (NN), artificial intelligence (AI), or machine learning (ML) algorithm to assess a diagnostic based on the one or more images of sample cartridge 101. Additionally, in some embodiments, image-capturing application 122 may include instructions to assess a quality control of the one or more images provided by enclosure 120B, based on sensor data indicative of the positioning of sample cartridge 101 within enclosure 120B. The sensor data may be provided by sensors disposed within enclosure 120B.

In some embodiments, device 110 may further include an image-capturing device 100c to collect an image of a fiduciary label 105 on sample cartridge 101. Accordingly, image-capturing application 122 may incorporate the image of fiduciary label 105 on sample cartridge 101 into a measurement protocol. The measurement protocol may be transmitted by device 110 to server 130 and/or to database 152, where metadata associated with sampling cartridge 101 may be correlated with information stored therein. For example, in some embodiments, the metadata in fiduciary label 105 may be correlated with a user ID and/or with an assay identification code (e.g., an indicator of the assay on sample cartridge 101, such as an immunoassay for influenza A and/or B, *Streptococcus pneumoniae*, Group A Streptococcal, Group B Streptococcal, respiratory syncytial virus (RSV), herpes simplex virus (HSV 1 and/or HSV 2), human metapneumovirus (hMPV), *Legionella* pneumophilia, or other infectious agent; an assay for antibodies associated with Lyme disease; an assay for markers of pregnancy (human chorionic gonadotropin), sexually transmitted disease (e.g., *Chlamydia*), hepatitis, or any other disease or condition).

In some embodiments, image-capturing application 122 may also include instructions for the user as to the mode of use and a measurement protocol for sample cartridge 101. For example, the instructions may illustrate to the user, step by step, how to collect a sample (e.g., using a swab or other extraction mechanism), mix the sample with appropriate reagents, and provide at least a portion of the sample into sample cartridge 101. Accordingly, image-capturing application 122 may display the instructions and other illustrative icons to the user on a display 116 of client device 110.

Hereinafter, architectures 10a and 10b will be collectively referred to as "architectures 10," image-capturing devices 100a and 100b will be collectively referred to as "image-capturing devices 100," enclosures 120a and 120b will be collectively referred to as "enclosures 120 or as "dark chambers" 120," and optics coupling mechanisms 115a and 115b will be collectively referred to as "optics coupling mechanisms 115."

Figure 2:
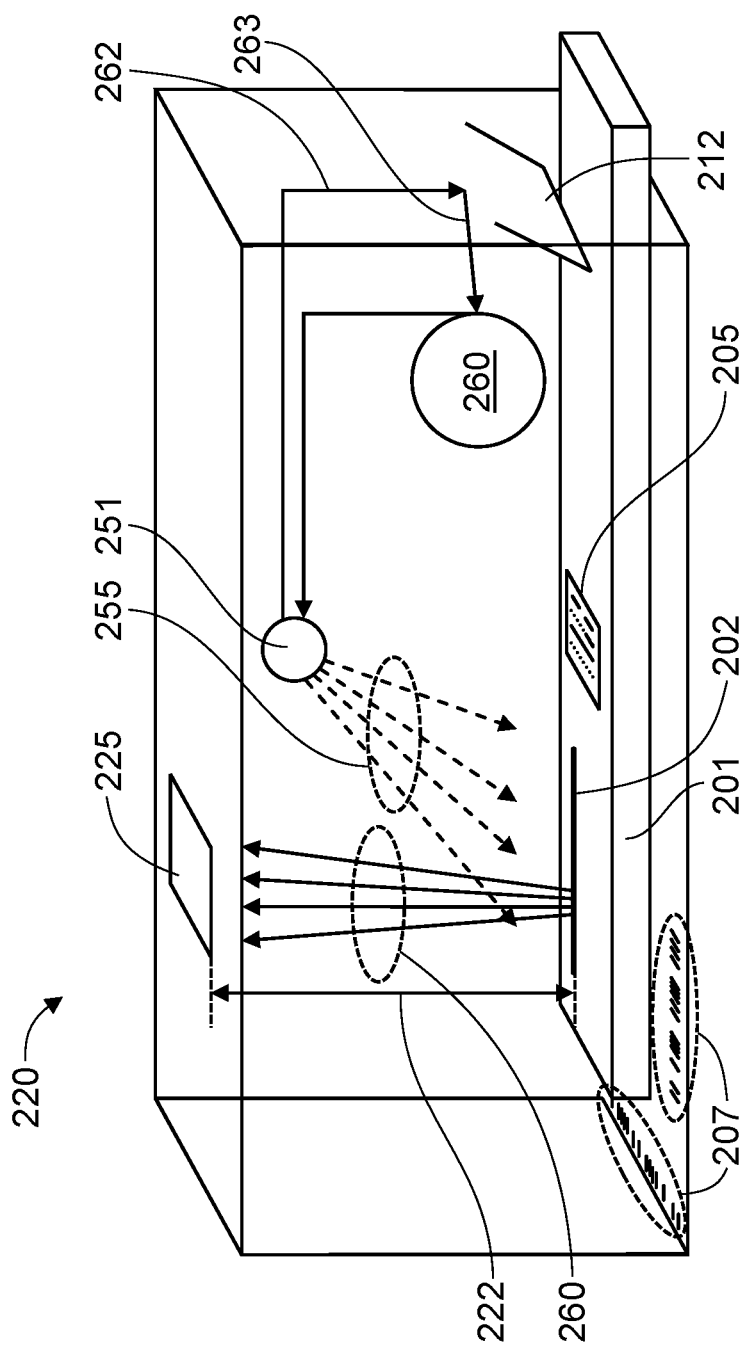
FIG. 2 illustrates an enclosure including a cartridge aperture to receive a sample cartridge, according to some embodiments.
Figure 3A:
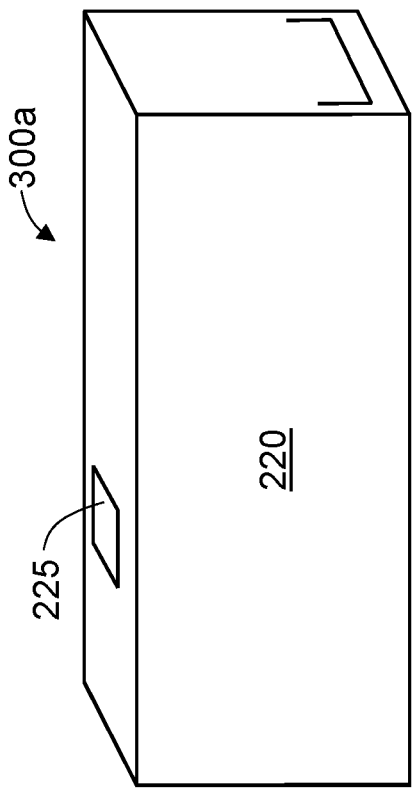
FIGS. 3A-3D are block diagrams illustrating steps in a method for remote assessment of a sample assay for disease diagnostics, according to some embodiments.
Figure 3B:
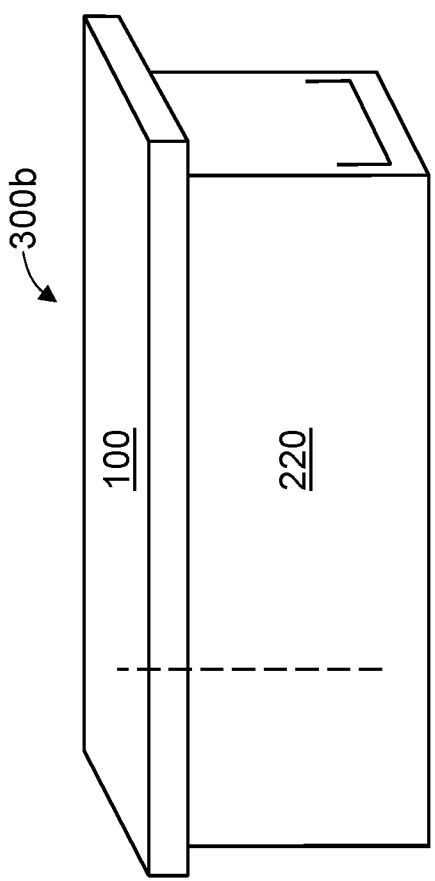
Figure 3C:
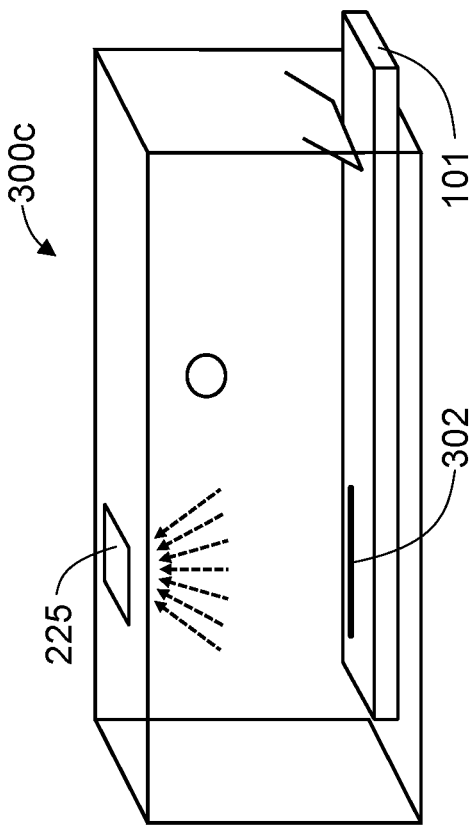
Figure 3D:
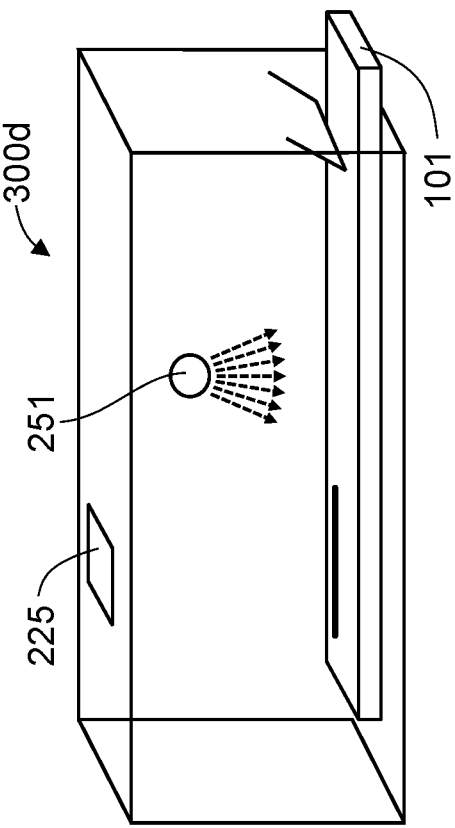

FIG. 2 illustrates an enclosure 220 (also referred to as a dark chamber) including a cartridge aperture 212 to receive a sample cartridge 201, according to some embodiments. In some embodiments, enclosure 220 has a flat top side and a flat bottom side. In some embodiments, cartridge aperture 212 is disposed on a side adjacent to the flat bottom side and is configured to enable sample cartridge 201 to be disposed at least partially on the flat bottom side that is facing the flat top side. Cartridge aperture 212 is configured to at least partially close when sample cartridge 201 is at least partially disposed on the flat bottom side, on an interior portion of enclosure 220. In this manner, any stray light exterior to the enclosure is prevented from reaching a sensor array in the image-capturing device (e.g., sensor array 140 in image-capturing devices 100, cf. FIGS. 1A-1B).

An image capture aperture 225, preferably disposed on a side of the enclosure such as the top side, enables an optical coupling mechanism in the image-capturing device, when the image-capturing device is disposed on an exterior portion of the enclosure or within the interior of the enclosure (e.g., optics coupling mechanisms 115 in architectures 10, cf. FIGS. 1A-1B). Thus, the image-capturing device may form a partial image of sample cartridge 201 when sample cartridge 201 is at least partially disposed on the flat bottom side. A light emitting device 251 in an interior portion of enclosure 220 may emit a fluorescence excitation light 255. Accordingly, light emitting device 251 is configured to excite a fluorescence light 260 from sample cartridge 201. Further, in some embodiments, light emitting device 251 is selected so that fluorescence light 260 has a wavelength within a selected color in the sensor array of the image-capturing device. For example, in some embodiments, light emitting device 251 is configured to emit a light at a wavelength of about 385 nm (ultra-violet) to excite a fluorescent radiation from a fluorophore at about 650 nm. Other combinations of excitation wavelengths and fluorescence radiation wavelengths may be used according to the convenience of finding adequate fluorophore substances and compounds. In some embodiments, the wavelength combination of fluorescence excitation light 255 and the fluorescence emission light 260 is based, at least partially, on the sensitivity and spectral resolution of the sensor array in the image-capturing device.

In some embodiments, enclosure 220 also includes a battery 261 configured to provide a power to light emitting device 251. Enclosure 220 further includes a circuit 262 coupling battery 261 with light emitting device 251. In some embodiments, circuit 262 is configured to remain open (e.g., light emitting device 251 'off') when sample cartridge 201 is outside enclosure 220, and to be closed (e.g., light emitting device 251 'on') when sample cartridge 201 is disposed at least partially on the flat bottom side. In some embodiments, circuit 262 includes a switch 263 to enable and/or disable light emitting device 251. In some embodiments, insertion of battery 261 can cause light emitting device 251 to function. Battery 261 may include a rechargeable battery, or a disposable battery. Further, in some embodiments, a power supply for light emitting device 251 may be provided by the image-capturing device, via a wired or a wireless connection (e.g., via communications modules 118, cf. FIG. 1B).

In some embodiments, a focusing mark 207 is positioned in the interior of the enclosure. For example, FIG. 2 shows a focusing mark 207 on the flat bottom side of enclosure 220 on the interior portion. Focusing mark 207 is configured to allow the image-capturing device to focus the optical coupling mechanism at the appropriate focal distance 222 when light emitting device 251 is turned 'on.' In some embodiments, focusing mark 207 may include a two-dimensional pattern to serve as a guide in the image-capturing application (e.g., image-capturing application 122, cf. FIGS. 1A-1B) of the image-capturing device to rotate and/or de-skew the image and find the correct orientation of enclosure 220 relative to the image-capturing device. In some embodiments, sample cartridge 201 may include a fiduciary tag 205 that the image-capturing device may also use as a focusing mark to further identify the relative orientation and positioning of a sensitive area 202 relative to the image-capturing device. Fiduciary tag 205 may also include information readable by the image-capturing device, indicative of a type of test assay included in the sensitive area, dimensions and other characteristics of the sensitive area that may be relevant for the test assessment, including an identification of the user and or patient providing the sample for test. Thus, fluorescent emission light 260 may be collected through image-capturing aperture 225 by the optics coupling mechanism of the image-capturing device.

While some of the descriptions herein are focused on fluorescence spectroscopic analysis of the sample cartridge, some embodiments consistent with the present disclosure may include any other type of electromagnetic interaction and spectroscopic analysis. Some examples of spectroscopic analysis consistent with the present disclosure may include Raman spectroscopy, infrared absorption spectroscopy, infrared reflectance/transmittance spectroscopy, and the like. Furthermore, in some embodiments, light emitting source 251 may be replaced by an optical coupling mechanism (e.g., a lens, mirror, prism, diffraction grating, or any combination thereof) to use solar radiation (e.g., during day light) or any exterior illumination to excite a spectroscopic response of the sensitive area in sample cartridge 201.

Enclosure 220 is configured to avoid or control any external light to interfere with fluorescence excitation light 255 or with the fluorescence emission light 260 collected by the image-capturing device. For example, it is desirable to illuminate sensitive area 202 in sample cartridge 201 uniformly (e.g., no shadows, bright spots, or other artifacts) to create a smooth spectroscopic background that can be filtered out by the image-capturing application in the image-capturing device.

FIGS. 3A-3D are block diagrams illustrating a sequence of steps in a method for remote assessment of a sample assay for detection of the presence or absence of an analyte, for example, for diagnosis of a condition of a disease, according to some embodiments. In step 300a, enclosure 220 is provided to the user. In step 300b, the user places image-capturing device 100 on a top side of enclosure 220, ensuring that aperture 225 in enclosure 220 overlaps with a lens system (e.g., optical couplings 115, cf. FIGS. 1A-1B) in image-capturing device 100. Alternatively, not shown in FIG. 3B, enclosure 220 comprises an image-capturing device in aperture 225 with optical couplings. In step 300c, sample cartridge 101 comprising, for example, and immunoassay test strip, having a sensitive area 302 is introduced into the enclosure 220. In an embodiment, cartridge 101 has a length and less than the full length of the cartridge is introduced into the enclosure. Concurrent with or after insertion of the cartridge, according to some embodiments, light source 251 is turned on, thereby illuminating the interior of enclosure 220. With the illuminated sample cartridge 101, the optical coupling of image-capturing device 100 may perform an autofocus routine so that the sensitive portion of sample cartridge 101 is well focused on a sensor array of image-capturing device 100 (e.g., sensor array 140, cf. FIG. 1A). In some embodiments, image-capturing device 100 may tolerate a slightly unfocussed image of the sample assay and sample cartridge 101, and may be configured to compensate for any blur or distortion via image processing in an image-capturing application (e.g., image-capturing application 122, cf. FIG. 1A). The autofocus routine is beneficial because image-capturing device 100 may not be setup appropriately at the time when the user places it on enclosure 220 (step 300b) or, for embodiments where image-capturing device 100 is part of enclosure 220, the autofocus routine is beneficial because the position of the sensitive area of the cartridge may vary from one cartridge to another. Accordingly, step 300d includes capturing light scattered from the sensitive area of the sample cartridge (e.g., fluorescence light 260, cf. FIG. 2) into image-capturing device 100, forming an image, and either processing the image in image-capturing device 100, or sending the image to a remote server for processing and to a remote database for storage (e.g., server 130 and database 152, cf. FIGS. 1A-1B). In some embodiments, both processing and storage functions may be performed at least partially by the image-capturing device.

Figure 4A:
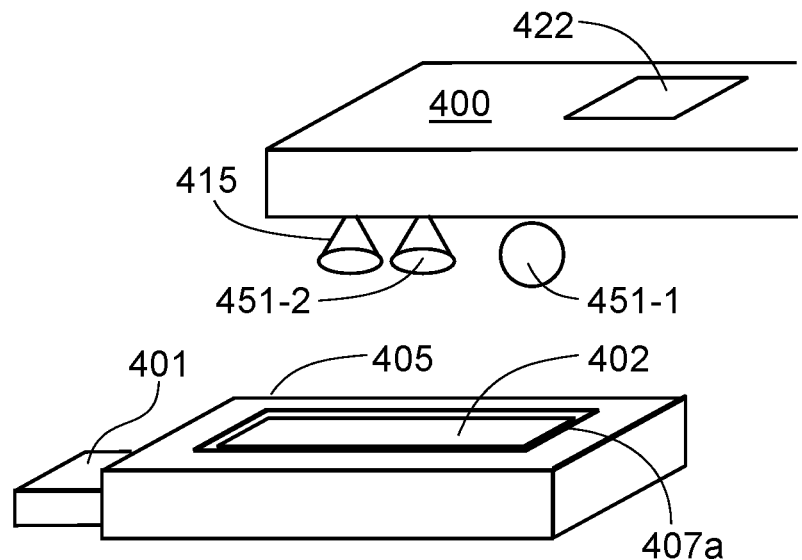
FIG. 4A illustrates an enclosure including a sample cartridge having a colored fiducial for identifying the location of a sample assay feature, according to some embodiments.

FIG. 4A illustrates an enclosure including a sample cartridge 401 having a colored fiducial 407a that includes a sensitive area 402, for identifying the location of a sample assay feature, according to some embodiments. In some embodiments, an excitation-based sample assay triggers fluorescence emission at a specified wavelength (e.g., the wavelength of the fluorescence light source 451-1, such as 385 nm, and the like). In some embodiments, before preforming the fluorescence stimulation and analysis with the fluorescence light source 451-1, a setup step is performed to identify the location of interest, using a second light source 451-2. Light source 451-2 may include a white light source or any other light source (e.g., a white LED) that includes a broadband wavelength emission range separate from the fluorescence pump wavelength.

The setup step includes an insert-within dark chamber (or enclosure) 405 to receive sample cartridge 401. Insert-within enclosure 405 has an aperture that allows optical access to the sample assay inside from optics coupling mechanism 415 in image-capturing device 400. Colored fiducial 407A is printed around the assay aperture (or disposed around the aperture with a sticker, and the like). Colored fiducial 407A may have a box shape surrounding the area of interest (the sample assay) in a specific color (such as green).

A setup step includes turning light source 451-2 'on,' to illuminate the entire system. Image-capturing device 400 collects a picture of insert-within enclosure 405 with colored fiducial mark 407a indicating the assay location. Image-capturing application 422 scans the picture to find the location of colored fiducial 407a. The coordinates of colored fiducial 407a are used to precisely locate the assay sample within a frame of the camera in optics coupling mechanism 415. In some embodiments, image-capturing application 422 may be configured to find the corners of the green box in the colored fiducial 407a.

When the sample assay is precisely located, light source 451-2 is turned 'off' and fluorescence light source 451-1 is turned 'on' to interact with the assay. The coordinates created with colored fiducial 407a are used to locate the assay and its subcomponents such as sample/control lines.

Figure 4B:
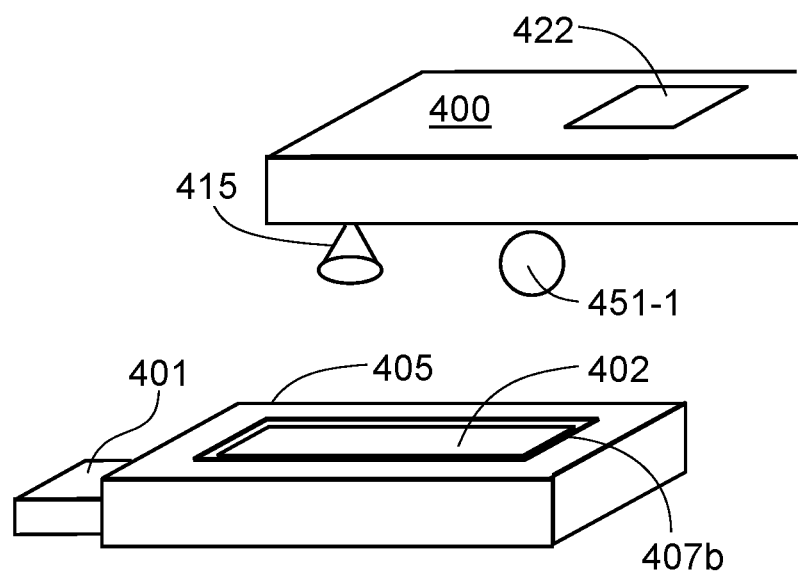
FIG. 4B illustrates an enclosure including a sample cartridge having a fluorescent fiducial for identifying the location of a sample assay feature, according to some embodiments.

FIG. 4B illustrates insert-within box or enclosure 405 including sample cartridge 401 having a fluorescent fiducial 407b that includes a sensitive area 402, for identifying the location of a sample assay feature, according to some embodiments. Accordingly, embodiments consistent with this disclosure may not use the white light source to illuminate a colored fiducial. Instead, fluorescent fiducial 407b is formed of a fluorescent material (e.g., ink/dye and the like) that may be excited with the same fluorescent light source that excites the sample assay. Optics coupling mechanism 415, fluorescence light source 451-1, and image-capturing application 422 are as described above in reference to FIG. 4A.

In some embodiments, the emission wavelength of fluorescent fiducial 407b, while detectable by image-capturing device 400, may be different from the emission wavelength of the sample assay. For example, in some embodiments (e.g., when the sample assay emits red fluorescence at about 650 nm), fluorescent fiducial 407b may be selected in the green wavelength. In such configuration, the full spectral efficiency of a red-green-blue pixel array in image-capturing device 400 (as is customary in smart phones and other mobile appliances) may be efficiently used.

Figure 5:
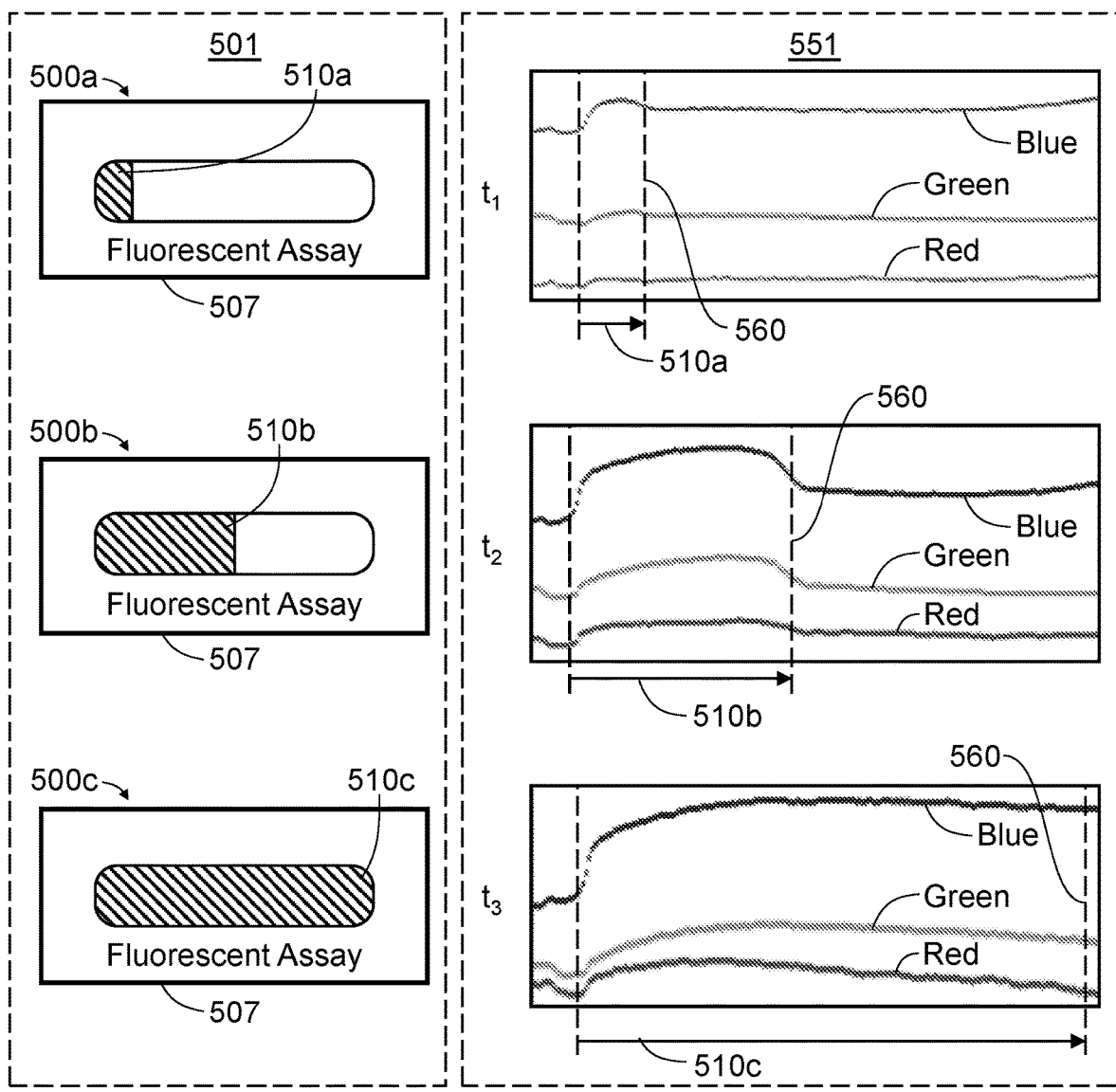
FIG. 5 illustrates a series of images of the sensitive area of a sample cartridge including a blank assay, collected over time, according to some embodiments.

FIG. 5 illustrates a series of images 500a, 500b, and 500d (hereinafter, collectively referred to as "images 500") of the sensitive area of a sample cartridge including a blank assay (e.g., no test strips), collected over time, according to some embodiments. A cross-section of the blue, green, and red pixel counts 551 in the longitudinal direction of the sample assay is also shown, for each one of images 500. In the example illustrated, a blank assay is used (no test strip), and therefore little to no red fluorescence is detected. Most of the signal observed comes from blue scattered light form a fluorescence excitation light (e.g., fluorescent excitation light 260), and as the signal progresses there are no features that arise, other than a 'hump' or step in the pixel count that indicates the starting edge of the sensitive area and the diffusion boundary of the assay. In the figure, the diffusion boundary 510a, 510b, and 510c (hereinafter, collectively referred to as "diffusion boundary 510") moves from left to right as illustrated by a rise in the signal for the red, blue, and green pixel counts, the rise indicated at dashed line 560.

In the figure, multiple images 500 of a fluorescence assay 501 are obtained at different times, $t_1$, $t_2$, and $t_3$, respectively. A fiducial 507 indicates the position and limits of the sensitive area including the pixels having relevant assay information. While images 500 may not be consecutive, in some embodiments, the sampling time, e.g., the time interval between times $t_1$, $t_2$, and $t_3$, may be 15 seconds. For each of images 500, the collection time, per image capture, may be as low as about ½ second, or even less. In some embodiments, images 500 may be captured from a video sequence (e.g., when the image-capturing device includes video recording capabilities).

Figure 6:
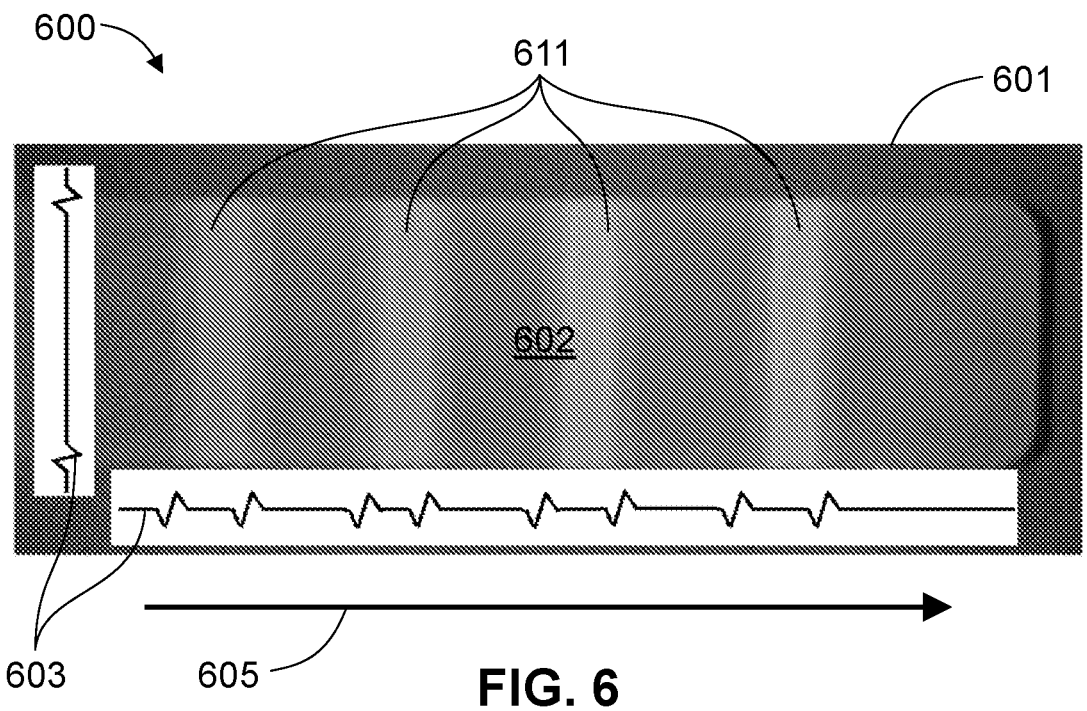
FIG. 6 illustrates an image of a sensitive area of a sample cartridge including a sample assay and positioning marks measured with an image-capturing device, according to some embodiments.

FIG. 6 illustrates an image 600 of a sensitive area 602 of a sample cartridge 601 including a sample assay and positioning marks 603 measured with an image-capturing device (e.g., image-capturing device 100, cf. FIGS. 1A-1B), according to some embodiments. In some embodiments, sensitive area 602 may include multiple test strips or test lines 611 disposed in parallel to one another, at fixed intervals, and in a perpendicular direction to a general diffusion travel 650 of the assay solution. Test lines in sensitive area 602 typically correspond to regions on an immunoassay test strip where an immobilized binding member is positioned for capture of an indicator of the presence or absence of an analyte of interest. Test lines in sensitive area 602 may also include control and reference lines, as is known in the area of immunoassay test devices. Some embodiments may include adjusting image 600 by finding a scale factor between image 600 and sample cartridge 601. Accordingly, positioning marks 603 indicate the edges of test strips in the sample assay, and a proper scale factor may be determined by comparing a number of pixels between positioning marks 603 with the known width and positioning of test strips 611. For example, in some embodiments, positioning marks 603 may be determined by forming a spatial derivative of a pixel count function in the horizontal and/or vertical direction. The spatial derivative may include the first or second spatial derivative of the pixel count ($\partial x$, $\partial y$, $\partial^2 x$, $\partial^2 y$, $\partial x \partial y$).

In some embodiments, a digital filtering technique may be applied to image 600 to remove spectral and spatial artifacts from the sensitive area of sample cartridge 601. The spectral artifacts may include, for example, residual fluorescence excitation light (for example on the blue side of the spectrum) that may account for some of the blue pixel values, or even some of the red pixel values, in the sensor array. This may be the case, for example, when the red pixels of the image-capturing device show some sensitivity to at least a portion of the blue emission spectrum of the light emitting source.

Some embodiments extract a value for assessing a diagnostic of the sample assay by spatially filtering image 600 and spectrally filtering image 600 as described above. Accordingly, the filtered pixel values may be aggregated and compared to a pre-selected threshold. Thus, when the aggregated value is lower or greater than the threshold, the disease diagnosis may be positive. Some embodiments may include error values based on statistical analysis and calibration, to provide a confidence interval for the diagnostics.

Figure 7:
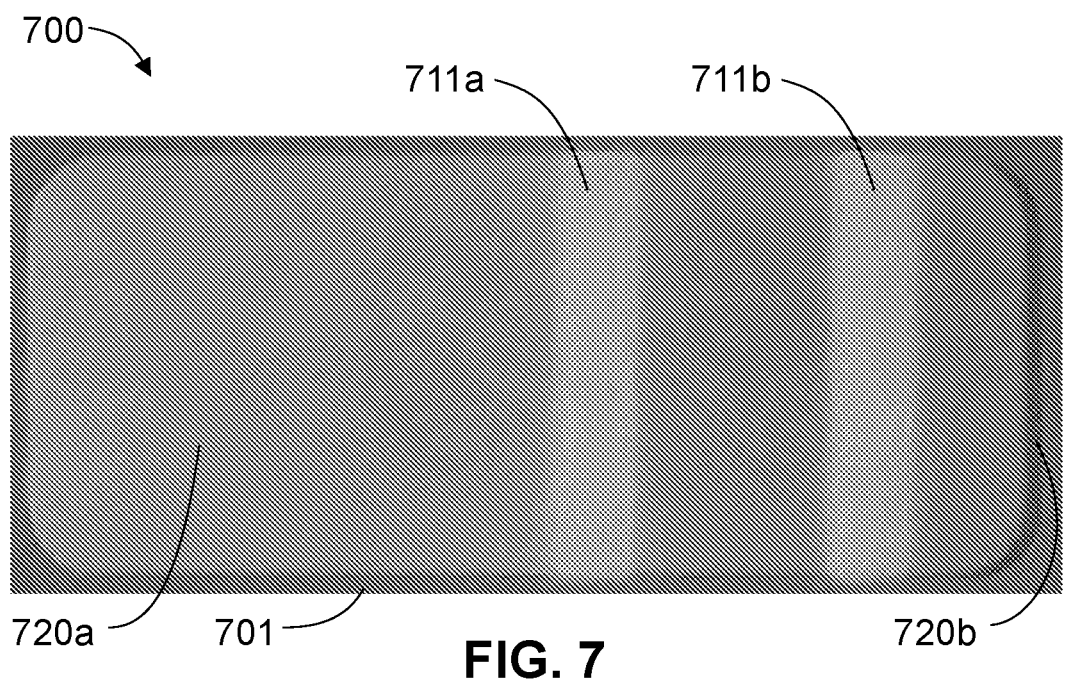
FIG. 7 illustrates an image of a sensitive area of a sample cartridge collected and processed by an image-capturing device, according to some embodiments.

FIG. 7 illustrates an image 700 of a sensitive area 702 of a sample cartridge 701 collected and processed by an image-capturing device (e.g., image-capturing devices 100, cf. FIGS. 1A-1B), according to some embodiments. Accordingly, a light emitting device is configured to excite a fluorescence light from sample cartridge 701 (e.g., light emitting source 251 and fluorescent light 260, cf. FIG. 2). In some embodiments, the fluorescence light has a wavelength within the selected color in a sensor array in the image-capturing device (e.g., sensor array 140, cf. FIG. 1A).

An immunoassay test strip contained in a sample cartridge, in some embodiments, emits fluorescence light primarily from fluorophores attached to the target analyte, as they are fixed on the substrate by adherence to the immunoproteins in the immunoassay strip (e.g., adsorption, chemisorption, immune-ligand, and the like). Accordingly, the presence of a red light within the boundaries of sensitive area 702 (e.g., an immunoassay strip) is mostly attributable to the presence of the target analyte (e.g., pathogens in a disease control, and the like). However, the amount of red signal within the boundaries of sensitive area 702 may include some fluorescence background 720a and even some excitation light background 720b. To better assess the background signal (e.g., not originated by target analytes fixed on the substrate of the immunoassay strip), some sample cartridges 701 may include a control test line 711b, or a reference test line, in addition to test line 711a.

Figure 8:
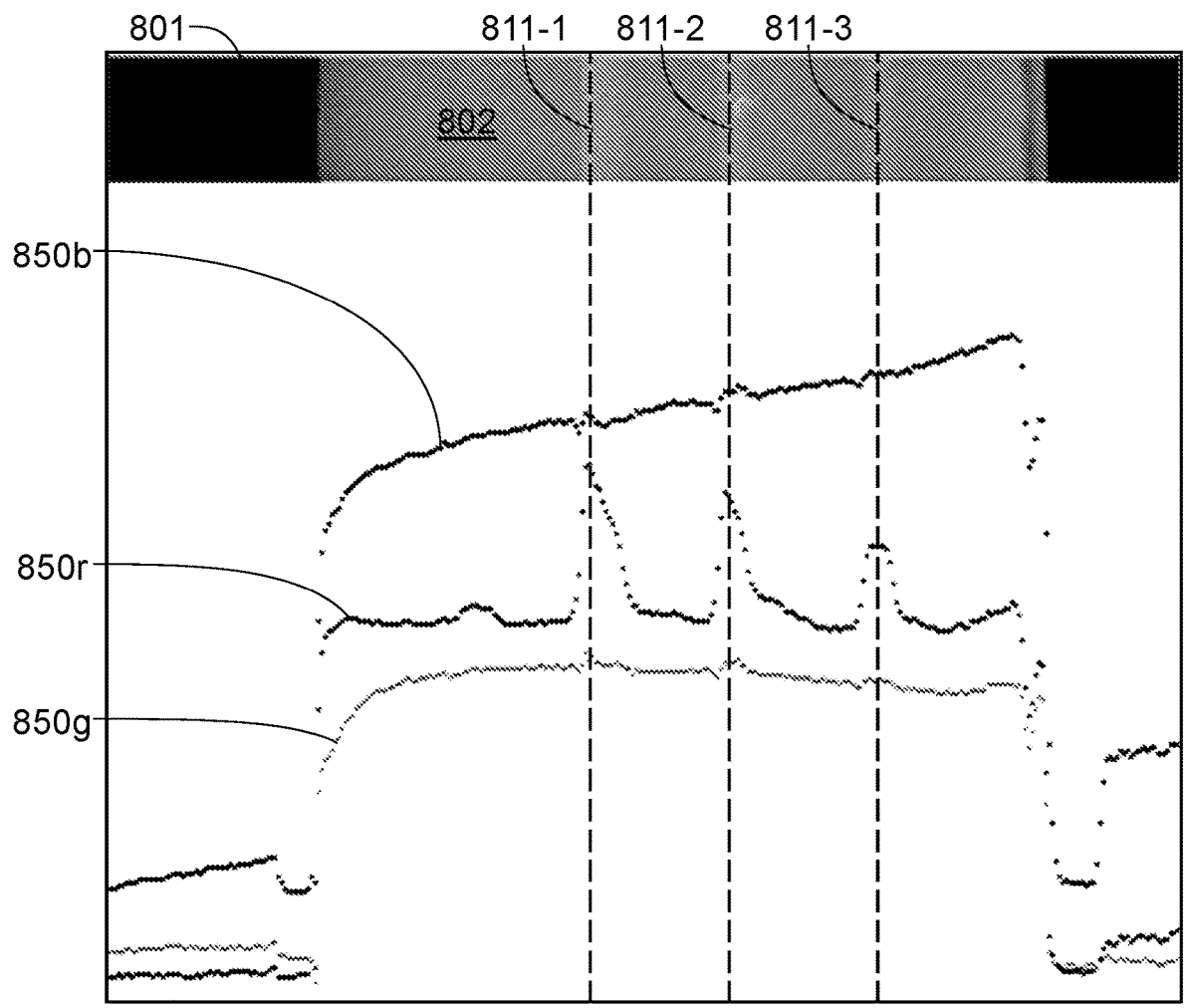
FIG. 8 illustrates cross-sections of fluorescence signals captured from a sample assay along a longitudinal direction, according to some embodiments.

FIG. 8 illustrates cross-sections 850b, 850r, and 850g (hereinafter, collectively referred to as "cross-sections 850") of fluorescence signals captured from a sample assay along a longitudinal direction, according to some embodiments. A sample cartridge with an immunoassay contained therein 801 includes a sensitive area 802 with test line 811-1, test line 811-2, and test line 811-3 (hereinafter, collectively referred to as "test lines 811"). An image-capturing application (e.g., image-capturing application 122, cf. FIGS. 1A-1B) integrates pixel counts along the width direction of the sample assay (along vertical dotted lines in the figure) in cross-sections 850. In some embodiments, the image-capturing application may separately integrate the values of blue pixels (850b), red pixels (850r), and green pixels (850g). Accordingly, in embodiments where the fluorescent light source is in the blue or UV spectral region (e.g., 385 nm), blue pixels (cross-section 850b) will mostly capture a background scattering from the fluorescent light source. When this is the case, the fluorescence emission may have a wavelength in the red visible spectral region (e.g., 650 nm), and the integration of red pixels in cross-section 850r by the image-capturing application will distinctly collect the fluorescent emission from each of the lines 811. Note how, according to some embodiments, pixel integration may accurately capture an intensity of the fluorescent signal emitted from each of test lines 811, thus enabling accurate quantification of the measurements. The green pixels (cross-section 850g), while not sensitive to either the fluorescent light source or the fluorescence emission, may be sensitive to a colored fiducial (e.g., colored fiducial 407a or fluorescent fiducial 407b, cf. FIGS. 4A and 4B), or may provide a flat background signal indicative of the profile of the sample assay (e.g., width), and the location and width of each of the test lines.

As shown in the figure, the three different spectral data analysis (e.g., blue pixels (850b), red pixels (850r), and green pixels (850g)) are collected and performed simultaneously, or almost simultaneously, during a single image-capturing sequence. Accordingly, in some embodiments, a user may not be asked to perform any extra step, nor even to align sample cartridge 801 relative to the image-capturing device, as this alignment may be performed in software by the image-capturing application using the fiducial mark.

Figure 9:
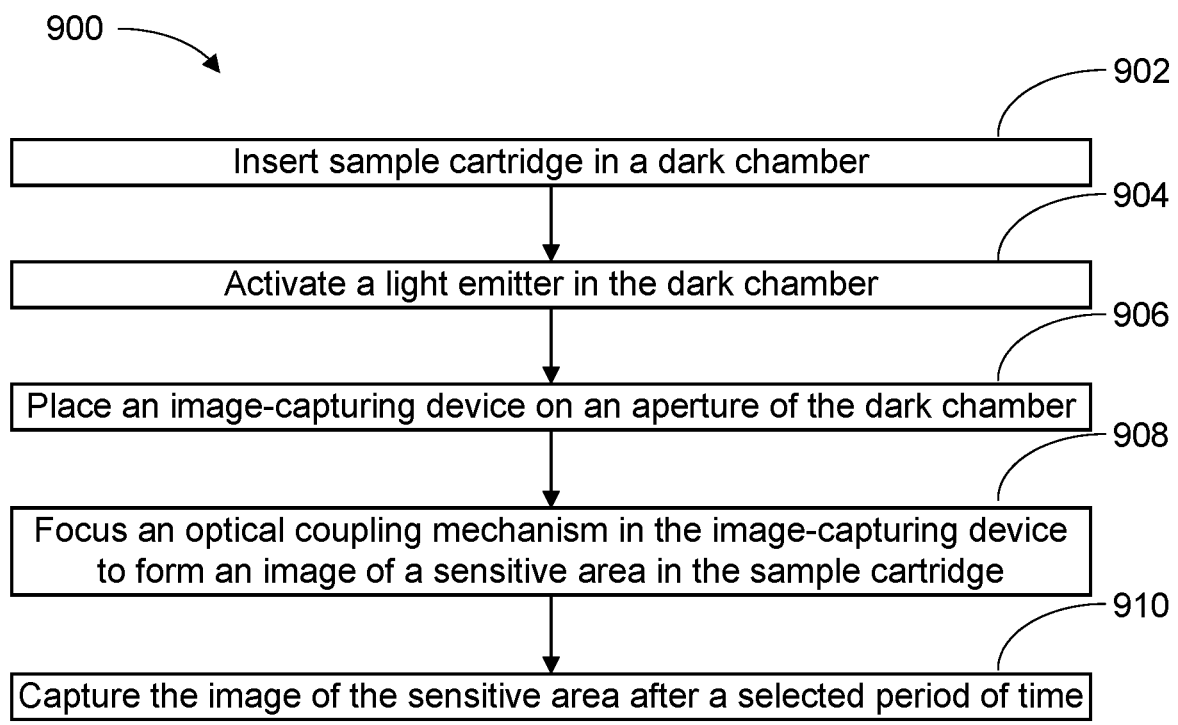
FIG. 9 is a flow chart illustrating steps in a method for capturing an image of a sensitive area in a sample cartridge using an image-capturing device and a dark chamber, according to some embodiments.

FIG. 9 is a flow chart illustrating steps in a method 900 for capturing an image of a sensitive area in a sample cartridge using an image-capturing device and an enclosure (e.g., sensitive area 202, sample cartridge 101, image-capturing devices 100, and enclosures 120 and 220, cf. FIGS. 1A-1B, and 2), according to some embodiments. Method 900 may be performed at least partially by a computer in a server or user device (e.g., server 130, user device 110, cf., FIGS. 1A-1B, 2, 3, and 4A-4B). Accordingly, at least some of the steps in method 900 may be performed by a processor executing instructions stored in a memory and providing data to a remote database through a network (e.g., image-capturing application 122, database 152, and network 150, cf. FIGS. 1A and 1B). Further, methods consistent with the present disclosure may include at least one step as described in method 900. In some embodiments, methods consistent with the present disclosure include one or more steps in method 900 performed in a different order, simultaneously, almost simultaneously, or overlapping in time.

Step 902 includes inserting a sample cartridge in a dark chamber (or enclosure). In some embodiments, step 902 includes interacting a user sample containing a biological residual from a user with a reagent, in the sample cartridge.

Step 904 includes activating a light emitter in the dark chamber. In some embodiments, step 904 includes activating a fluorescence excitation source.

Step 906 includes placing an image-capturing device on an aperture of the dark chamber.

Step 908 includes focusing an optical coupling mechanism in the image-capturing device to form an image of a sensitive area in the sample cartridge.

Step 910 includes capturing the image of the sensitive area after a selected period of time. In some embodiments, step 910 includes capturing a second image of the sensitive area after a second period of time, and determining the selected period of time and the second period of time based on a diffusion time for a reagent fluid in a membrane contained in the sensitive area in the sample cartridge. In some embodiments, step 910 includes storing the image of the sensitive area in a memory in the image-capturing device. In some embodiments, step 910 transmits the image of the sensitive area over a network to a remote server. In some embodiments, step 910 includes capturing a digital image including discrete values associated with an array of pixels in the image-capturing device, the method further comprising applying a spatial filter and a color filter to the digital image to determine a presence of a target agent in the sensitive area of the sample cartridge. In some embodiments, step 910 includes determining the selected period of time according to a threshold of an intensity of a red light captured by the image-capturing device from a selected portion of the sensitive area. In some embodiments, step 910 includes storing the image as a fluorescence background image for data processing.

Figure 10:
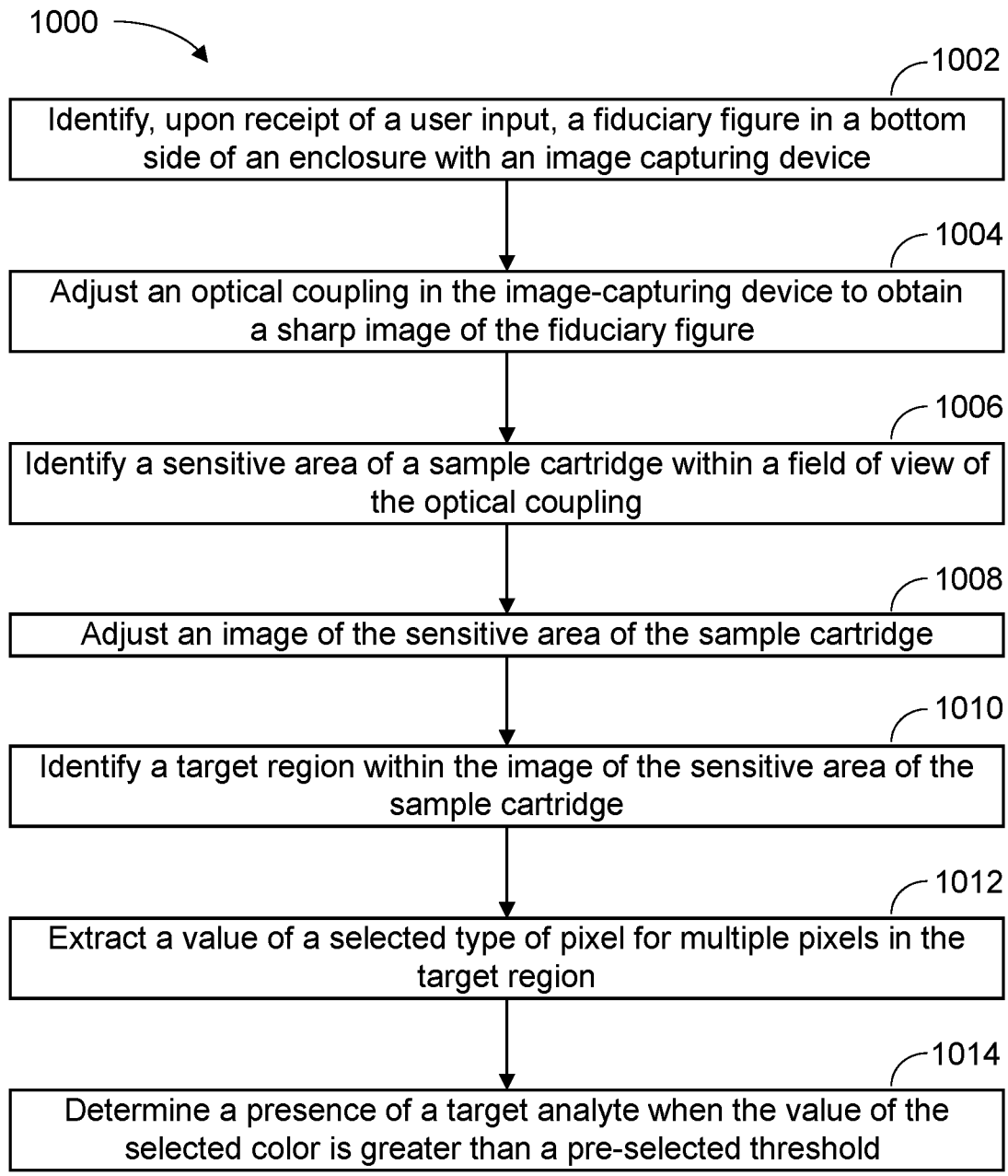
FIG. 10 is a flow chart illustrating steps in a computer-implemented method for remotely diagnosing a disease with an image-capturing device, according to some embodiments.

FIG. 10 is a flow chart illustrating steps in a computer-implemented method 1000 for remotely diagnosing a disease or condition, or for detecting presence or absence of an analyte or biomarker, from an image of the sensitive area in a sample cartridge captured with an image-capturing device (e.g., sensitive area 202, sample cartridge 101, image-capturing devices 100, and enclosures 120 and 220, cf. FIGS. 1A-1B, and 2), according to some embodiments. The sample cartridge comprises or corresponds to an immunoassay test. Method 1000 may be performed at least partially by a computer in a server or client (user) device (e.g., server 130, client device 110, cf., FIGS. 1A-1B, 2, 3, and 4A-4B). Accordingly, at least some of the steps in method 1000 may be performed by a processor executing instructions stored in a memory and providing data to a remote database through a network (e.g., image-capturing application 122, database 152, and network 150, cf. FIGS. 1A and 1B). Further, methods consistent with the present disclosure may include at least one step as described in method 1000. In some embodiments, methods consistent with the present disclosure include one or more steps in method 1000 performed in a different order, simultaneously, almost simultaneously, or overlapping in time.

Step 1002 includes identifying, upon receipt of a user input, a fiduciary figure in a bottom side of an enclosure with an image-capturing device.

Step 1004 includes adjusting an optical coupling in the image-capturing device to obtain a sharp image of the fiduciary figure.

Step 1006 includes identifying a sensitive area of a sample cartridge within a field of view of the optical coupling.

Step 1008 includes adjusting an image of the sensitive area of the sample cartridge. In some embodiments, step 1008 includes removing a horizontal skew and a vertical skew in the image. In some embodiments, step 1008 includes finding a border of the sensitive area of the sample cartridge and applying geometrical transformations on an area delimited by the border of the sample cartridge. In some embodiments, step 1008 includes filtering the image of the sensitive area of the sample cartridge to remove a color and a spatial artifact from the sensitive area of the sample cartridge. In some embodiments, step 1008 includes finding a scale factor between the image of the sensitive area of the sample cartridge and the sample cartridge.

Step 1010 includes identifying a target region within the image of the sensitive area of the sample cartridge.

Step 1012 includes extracting a value of a selected color for multiple pixels in the target region. In some embodiments, step 1012 includes spatially filtering the image and spectrally filtering the image to obtain a selected group of pixel values to form the value of the selected color.

Step 1014 includes determining a presence of a target analyte when the value of the selected color is greater than a pre-selected threshold.

Figure 11:
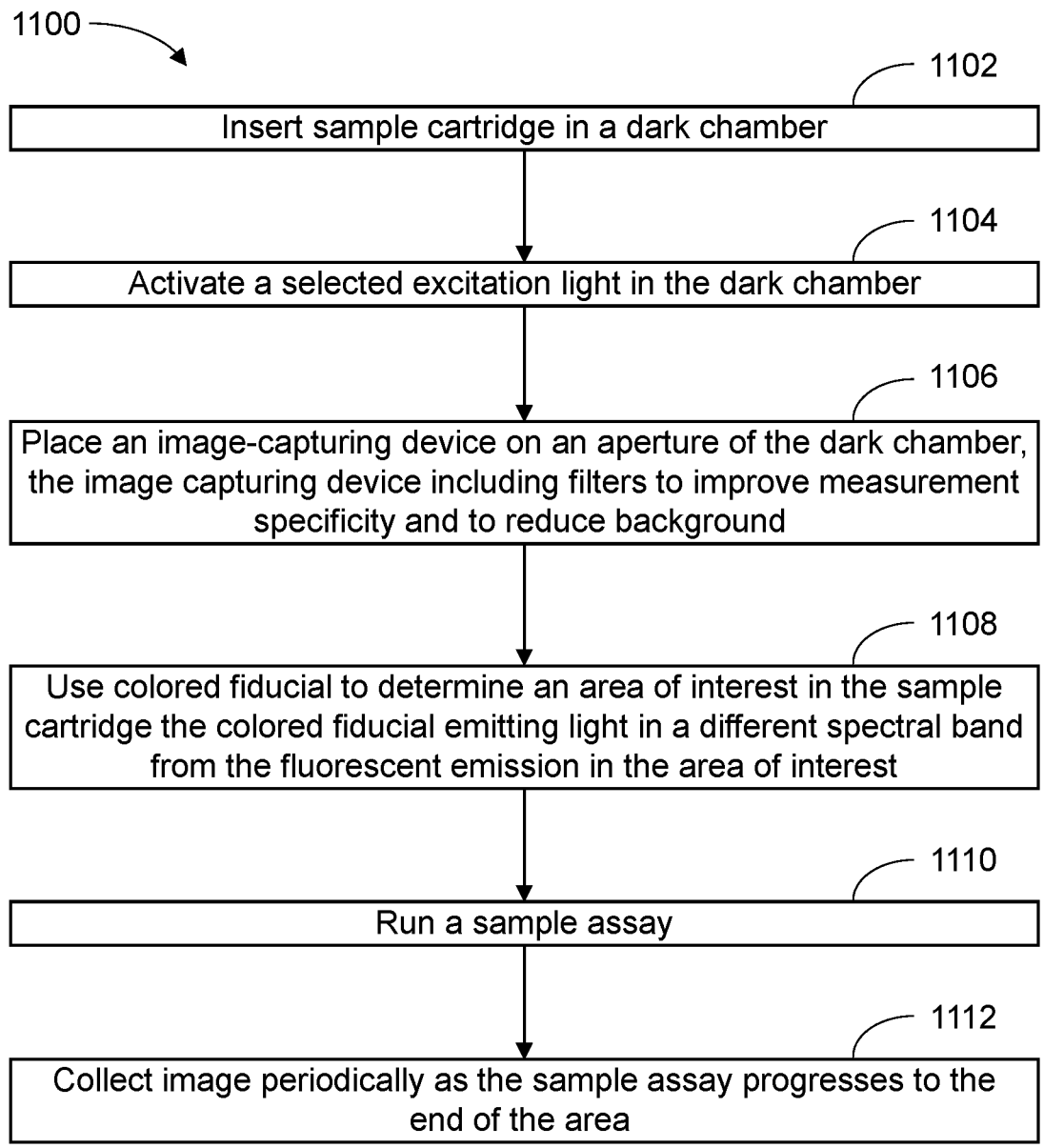
FIG. 11 is a flow chart illustrating steps in a method for remotely diagnosing a disease with an image-capturing device, according to some embodiments.

FIG. 11 is a flow chart illustrating steps in a method 1100 for remotely diagnosing a disease or condition, or for detecting presence or absence of an analyte or biomarker, with an image-capturing device, according to some embodiments. Method 1100 may be performed at least partially by a computer in a server or client device (e.g., server 130, client device 110, cf., FIGS. 1A-1B, 2, 3, and 4A-4B). Accordingly, at least some of the steps in method 1100 may be performed by a processor executing instructions stored in a memory and providing data to a remote database through a network (e.g., image-capturing application 122, database 152, and network 150, cf. FIGS. 1A and 1B). Further, methods consistent with the present disclosure may include at least one step as described in method 1100. In some embodiments, methods consistent with the present disclosure include one or more steps in method 1100 performed in a different order, simultaneously, almost simultaneously, or overlapping in time.

Step 1102 includes inserting a sample cartridge in a dark chamber. In some embodiments, step 1102 includes interacting a user sample containing a biological residual from a user with a reagent, in the sample cartridge. In some embodiments, step 1102 includes placing the sample cartridge in an insert-within box in the dark chamber.

Step 1104 includes activating a fluorescent excitation light (e.g., a blue LED, or a UV LED emitting at 385 nm) in the dark chamber. In some embodiments, step 1104 includes activating a fluorescence excitation source.

Step 1106 includes placing an image-capturing device on an aperture of the dark chamber, the image-capturing device including filters to improve measurement specificity and to reduce background.

Step 1108 includes using a colored fluorescent fiducial to determine an area of interest in the sample cartridge. In some embodiments, the green fluorescent fiducial is marked, or printed, or attached to a surface in the insert-within box of the dark chamber.

Step 1110 includes running a sample assay. In some embodiments, step 1110 includes causing the sample assay to diffuse from one edge of a sensitive area in the sample cartridge to the other edge of the sensitive area along a longitudinal direction of the sample cartridge.

Step 1112 includes collecting images periodically, with the image-capturing device, as the sample assay progresses (e.g., via capillary diffusion) to the end of the sensitive area in the sample cartridge. In some embodiments, step 1112 includes collecting images every 10 to 20 seconds, or every 15 seconds. In some embodiments, step 1112 may include collecting a continuous video of the sample assay as it progresses to the end of the sensitive area in the sample cartridge. In some embodiments, step 1112 includes transmitting the collected image or video to a remote server for processing. Further, in some embodiments, step 1112 includes processing the collected image or video with an image-capturing application in the image-capturing device, and storing the collected image in a memory in the image-capturing device. Further, in some embodiments, step 1112 includes analyzing all or a portion of an image or video to obtain a result, and transmitting the result over a network, for example, to a remote server or a database.

Figure 12:
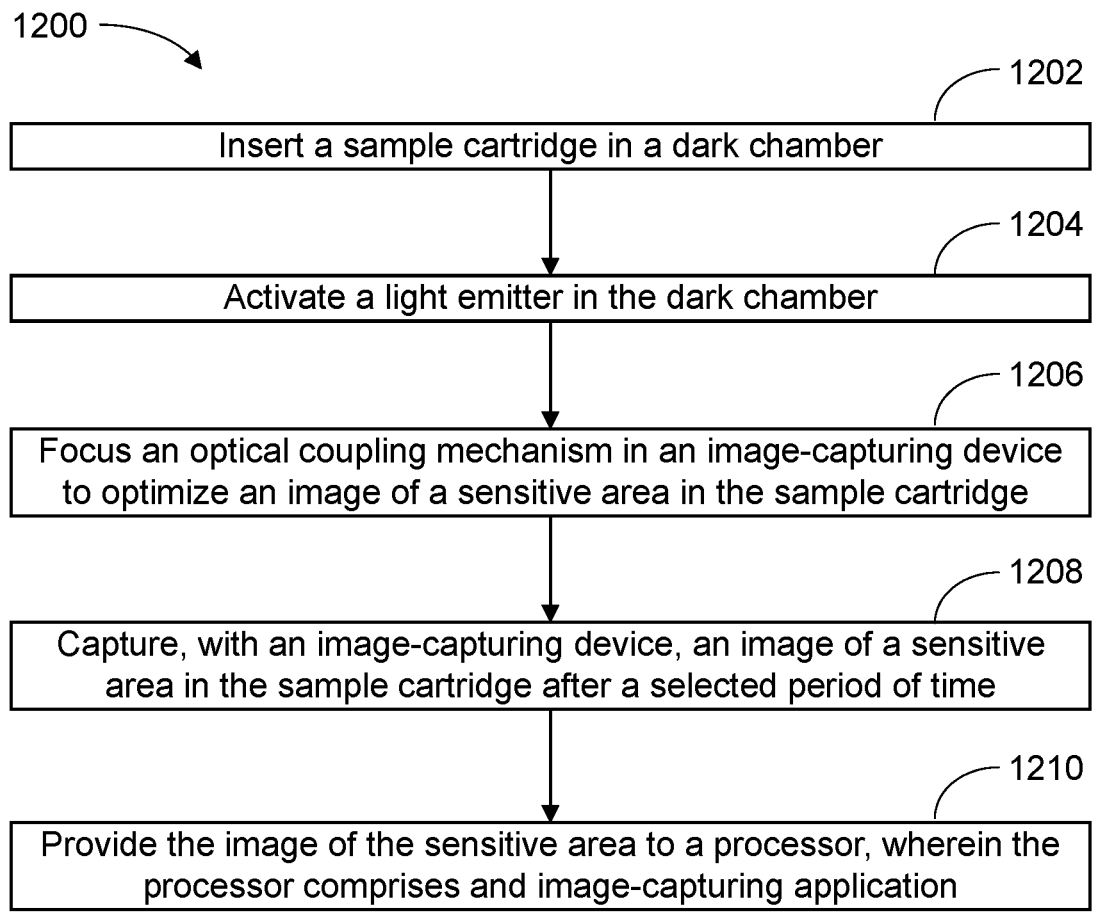
FIG. 12 is a flow chart illustrating steps in a method for diagnosing a disease with an image-capturing device, according to some embodiments.

FIG. 12 is a flow chart illustrating steps in a method 1200 for diagnosing a disease or condition, or for detecting presence or absence of an analyte or biomarker, with an image-capturing device, according to other embodiments. Method 1200 may be performed at least partially by a computer in a server or client (user) device (e.g., server 130, client device 110, cf., FIGS. 1A-1B, 2, 3, and 4A-4B). Accordingly, at least some of the steps in method 1200 may be performed by a processor executing instructions stored in a memory and providing data to a remote database through a network (e.g., image-capturing application 122, database 152, and network 150, cf. FIGS. 1A and 1B). Further, methods consistent with the present disclosure may include at least one step as described in method 1200. In some embodiments, methods consistent with the present disclosure include one or more steps in method 1200 performed in a different order, simultaneously, almost simultaneously, or overlapping in time.

Step 1202 includes inserting a sample cartridge in a dark chamber or enclosure.

Step 1204 includes activating a light emitter in the dark chamber or enclosure.

Step 1206 includes focusing an optical coupling mechanism in an image-capturing device to optimize an image of a sensitive area in the sample cartridge.

Step 1208 includes capturing, with an image-capturing device, an image of a sensitive area in the sample cartridge after a selected period of time. In some embodiments, step 1208 includes at least one of: (i) capturing multiple images of the sensitive area at a selected periodicity, or (ii) capturing a video recording of a sample assay as it is diffusively transported along the sensitive area in the sample cartridge. The step may optionally include identifying the sensitive area in the sample cartridge based on a shape and location of the fluorescent fiducial mark. It will be appreciated that subsequent to capturing one or more images or a video the one or more images or a video may be analyzed, before or after transmitting to a remote server or database. In some embodiments, Step 1208 includes analyzing one or more images or a video before transmitting to the remote server or database.

Step 1210 includes providing the image of the sensitive area to a processor, wherein the processor comprises an image-capturing application. In one embodiment, an analysis of an image before it is provided to the image-capturing application my occur. Such an analysis can be an analysis of a portion of an image or a partial of an image.

Figure 13:
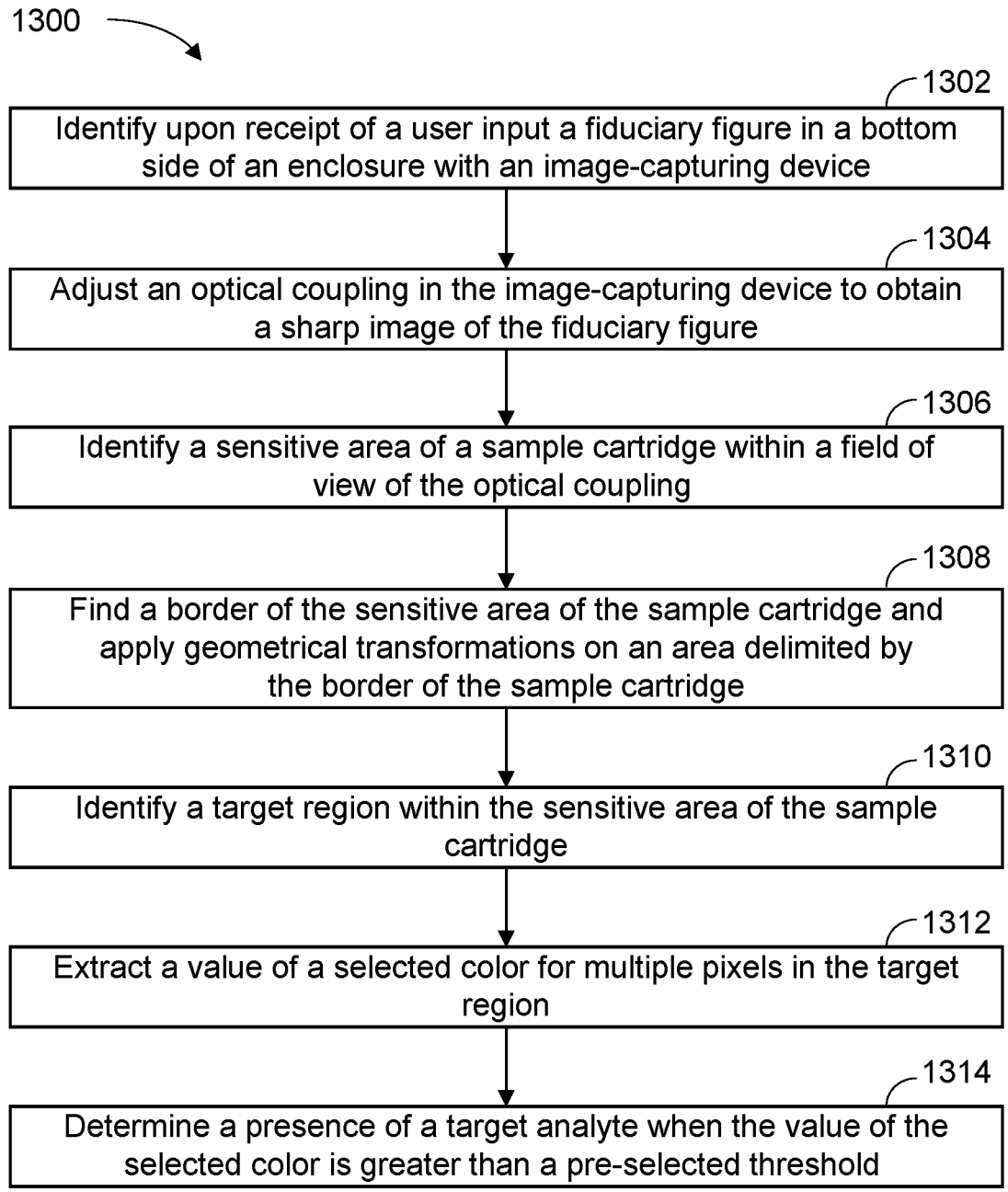
FIG. 13 is a flow chart illustrating steps in a method for diagnosing a disease with an image-capturing device, according to some embodiments.

FIG. 13 is a flow chart illustrating steps in a method 1300 for diagnosing a disease or condition, or for detecting presence or absence of an analyte or biomarker, with an image-capturing device, according to other embodiments. Method 1300 may be performed at least partially by a computer in a server or client device (e.g., server 130, client device 110, cf., FIGS. 1A-1B, 2, 3, and 4A-4B). Accordingly, at least some of the steps in method 1300 may be performed by a processor executing instructions stored in a memory and providing data to a remote database through a network (e.g., image-capturing application 122, database 152, and network 150, cf. FIGS. 1A and 1B). Further, methods consistent with the present disclosure may include at least one step as described in method 1300. In some embodiments, methods consistent with the present disclosure include one or more steps in method 1300 performed in a different order, simultaneously, almost simultaneously, or overlapping in time.

Step 1302 includes identifying, upon receipt of a user input, a fiduciary figure in a bottom side of an enclosure with an image-capturing device.

Step 1304 includes adjusting an optical coupling in the image-capturing device to obtain a sharp image of the fiduciary figure. In some embodiments, step 1304 further includes removing a horizontal skew and a vertical skew to adjust an image of the sensitive area of the sample cartridge. In some embodiments, step 1304 includes filtering an image of the sensitive area of the sample cartridge to remove a color and a spatial artifact from the sensitive area of the sample cartridge. In some embodiments, step 1304 includes finding a scale factor between the image of the sensitive area of the sample cartridge and the sample cartridge.

Step 1306 includes identifying a sensitive area of a sample cartridge within a field of view of the optical coupling.

Step 1308 includes finding a border of the sensitive area of the sample cartridge and applying geometrical transformations on an area delimited by the border of the sample cartridge.

Step 1310 includes identifying a target region within the sensitive area of the sample cartridge.

Step 1312 includes extracting a value of a selected color for multiple pixels in the target region.

Step 1314 includes determining a presence of a target analyte when the value of the selected color is greater than a pre-selected threshold.

Figure 14:
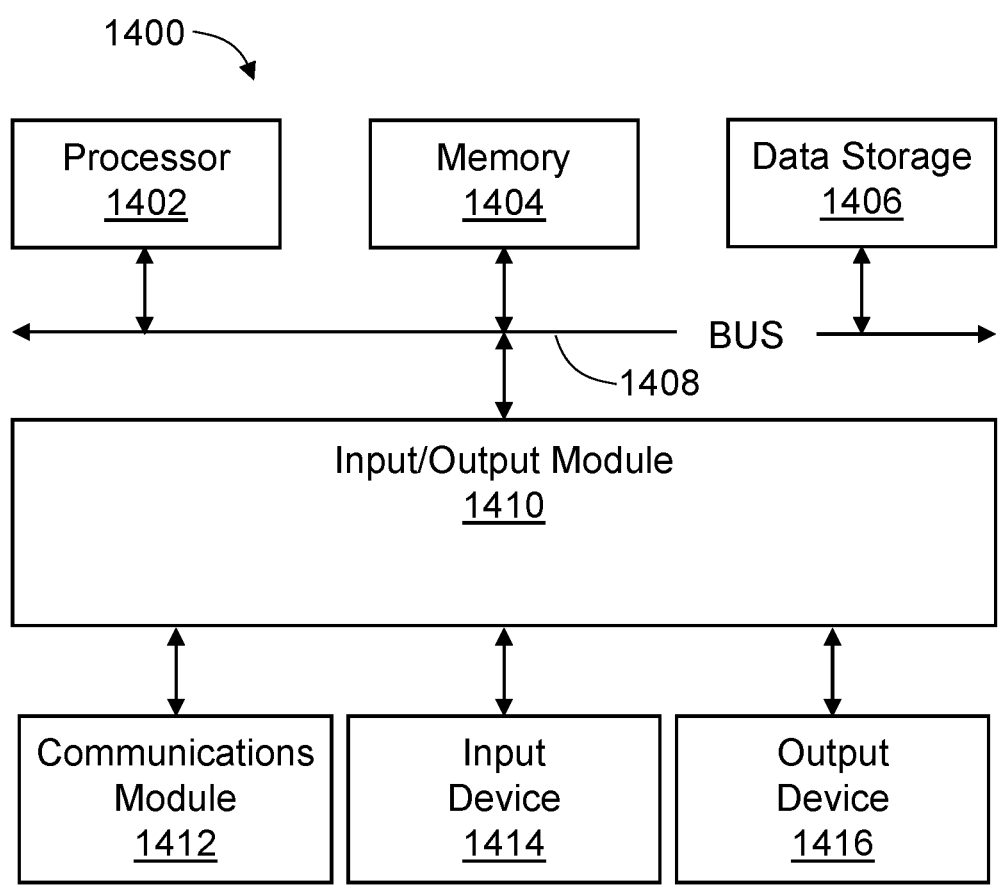
FIG. 14 is a block diagram illustrating an example computer system with which the image-capturing device and the server of FIGS. 1A-1B, and methods as disclosed herein can be implemented, according to some embodiments.

FIG. 14 is a block diagram illustrating an example computer system 1400 with which the image-capturing device and the server of FIG. 1, and the methods as disclosed herein can be implemented, according to some embodiments. In certain aspects, computer system 1400 may be implemented using hardware or a combination of software and hardware, either in a dedicated server, or integrated into another entity, or distributed across multiple entities.

Computer system 1400 (e.g., server in FIG. 1) includes a bus 1408 or other communication mechanism for communicating information, and a processor 1402 coupled with bus 1408 for processing information. By way of example, computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to the bus for storing information and instructions to be executed by the processor. Processor 1402 and memory 1404 can be supplemented by, or incorporated in, special purpose logic circuitry.

The instructions may be stored in memory 1404 and implemented in one or more computer program products, i.e., one or more modules of computer program instructions encoded on a computer-readable medium for execution by, or to control the operation of, the computer system, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command-line interface languages, compiled languages, concurrent languages, curly-bracket languages, dataflow languages, data-structured languages, declarative languages, esoteric languages, extension languages, fourth-generation languages, functional languages, interactive-mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. The memory may also be used for storing temporary variable or other intermediate information during execution of instructions to be executed by the processor.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to the bus for storing information and instructions. Computer system 1400 may be coupled via an input/output module 1410 to various devices. Input/output module 1410 can be any input/output module. Exemplary input/output modules include data ports such as USB ports. Input/output module 1410 is configured to connect to a communications module 1412. Exemplary communications modules include networking interface cards, such as Ethernet cards and modems. In certain aspects, input/output module 1410 may be configured to connect to a plurality of devices, such as an input device 1414 and/or an output device 1416. Exemplary input devices include a keyboard and a pointing device, e.g., a mouse or a trackball, by which a user can provide input to the computer system. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices include display devices, such as an LCD (liquid crystal display) monitor for displaying information to the user.

In some embodiments, computer system 1400 is a network-based, voice-activated device accessed by the user. Input/output device 1414 or 1416 may include a microphone providing the queries in voice format, and receiving multiple inputs from the user, also in a voice format, in the language of the user. Further, in some embodiments, a neural linguistic algorithm may cause the voice-activated device to contact the user back and receive a user selection of the respiratory mask via a voice command or request.

According to one aspect of the present disclosure, the image-capturing device and server of FIG. 1A can be implemented using computer system 1400 in response to processor 1402 executing one or more sequences of one or more instructions contained in memory 1404. Such instructions may be read into the memory from another machine-readable medium, such as the data storage device. Execution of the sequences of instructions contained in the main memory causes processor 1402 to perform the process steps described herein. One or more processors in a multi-processing arrangement may also be employed to execute the sequences of instructions contained in the memory. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., an image-capturing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., the network in FIG. 1) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1400 can include image-capturing devices and servers wherein the image-capturing device and server are generally remote from each other and typically interact through a communication network. The relationship of image-capturing device and server arises by virtue of computer programs running on the respective computers and having an image-capturing device-server relationship to each other. Computer system 1400 can be, for example, and without limitation, a desktop computer, laptop computer, or tablet computer. Computer system 1400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor for execution. Such a medium may take many forms, including, but not limited to, non-volatile media, volatile media, and transmission media. Non-volatile media include, for example, optical or magnetic disks, such as the data storage device. Volatile media include dynamic memory, such as the memory. Transmission media include coaxial cables, copper wire, and fiber optics, including the wires that comprise the bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
   inserting a sample cartridge in a dark chamber;
   activating a light emitter, configured to excite a fluorescence light from the sample cartridge, in the dark chamber;
   positioning an optical coupling mechanism in an image-capturing device with respect to the sample cartridge to obtain a sharp image of a sensitive area in the sample cartridge;
   capturing, with the image capturing device, fluorescence light scattered from the sensitive area of the sample cartridge after a selected period of time;
   providing the image of the sensitive area to a processor, wherein the processor comprises an image-capturing application;
   integrating along a selected direction of the image, with the image-capturing application, multiple pixel counts separately for different color pixels in a sensor array of the image-capturing device;
   digitally filtering the image of the sensitive area by determining a first spatial derivative of a pixel count in a horizontal and/or vertical direction of the sample cartridge;
   determining a presence of a target analyte based on an aggregate of the filtered pixel count; and
   capturing a second image of the sensitive area after a second period of time, and determining the selected period of time and the second period of time based on a diffusion time for a reagent fluid in a membrane contained in the sensitive area in the sample cartridge.

2. The method of claim 1, further comprising interacting a user sample containing a biological residual from a user with a reagent, in the sample cartridge.

3. The method of claim 1, wherein activating the light emitter in the dark chamber comprises activating a fluorescence excitation source.

4. The method of claim 1, wherein providing the image of the sensitive area to the processor comprises storing the image of the sensitive area in a memory of the image capturing device, and transmitting the image of the sensitive area over a network to a remote server or to a database.

5. The method of claim 1, wherein capturing the image of the sensitive area comprises capturing a digital image including discrete values associated with an array of pixels in the image-capturing device, the method further comprising applying a spatial filter and a color filter to the digital image to determine a presence of a target agent in the sensitive area of the sample cartridge.

6. The method of claim 1, further comprising determining the selected period of time according to a threshold of an intensity of a light captured by the image-capturing device from a control portion of the sensitive area.

7. The method of claim 1, wherein capturing the image of the sensitive area in the image-capturing device comprises storing the image as a fluorescence background image.

8. The method of claim 1, wherein using an image-capturing device to capture an image of a sensitive area in the sample cartridge comprises capturing an image of a fluorescent fiducial mark excited by the light emitter, and identifying the sensitive area in the sample cartridge based on a shape and location of the fluorescent fiducial mark.

9. The method of claim 1, wherein capturing the image of the sensitive area after a selected period of time comprises one of: (i) capturing multiple images of the sensitive area at a selected periodicity, or (ii) capturing a video recording of a sample assay as it is diffusively transported along the sensitive area in the sample cartridge.

10. A computer-implemented method, comprising:
identifying, upon receipt of a user input, a fiduciary figure in a bottom side of an enclosure with an image-capturing device;
adjusting, in the image-capturing device, an optical coupling to obtain a sharp image of the fiduciary figure;
identifying a sensitive area of a sample cartridge within a field of view of the optical coupling;
finding a border of the sensitive area of the sample cartridge and applying geometrical transformations on an area delimited by the border of the sample cartridge;
identifying a target region within the sensitive area of the sample cartridge;
integrating, with the image-capturing application, multiple pixel counts separately for different color pixels in a sensor array of the image-capturing device;
extracting a value of a selected color for multiple pixels in the target region;
determining a presence of a target analyte when the value of the selected color is greater than a pre-selected threshold; and
capturing a second image of the sensitive area after a second period of time, and determining the selected period of time and the second period of time based on a diffusion time for a reagent fluid in a membrane contained in the sensitive area in the sample cartridge.

11. The computer-implemented method of claim 10, further comprising removing a horizontal skew and a vertical skew to adjust an image of the sensitive area of the sample cartridge.

12. The computer-implemented method of claim 10, wherein adjusting an optical coupling comprises filtering an image of the sensitive area of the sample cartridge to remove a color and a spatial artifact from the sensitive area of the sample cartridge.

13. The computer-implemented method of claim 10, wherein adjusting an optical coupling comprises finding a scale factor between an image of the sensitive area of the sample cartridge and the sample cartridge.

14. The computer-implemented method of claim 10, wherein extracting a value comprises spatially filtering an image and spectrally filtering the image to obtain a selected group of pixel values to form the value of the selected color.

* * * * *